(No Model.) 5 Sheets—Sheet 1.

H. M. CHITTENDEN.
APPARATUS FOR DIPPING HAT BODIES.

No. 436,771. Patented Sept. 23, 1890.

WITNESSES:

INVENTOR
Harvey M. Chittenden
BY ATT'Y (No Model.) 5 Sheets—Sheet 2.

H. M. CHITTENDEN.
APPARATUS FOR DIPPING HAT BODIES.

No. 436,771. Patented Sept. 23, 1890.

WITNESSES:
J. T. Finch
Chas. H. Fleming

INVENTOR
Harvey M. Chittenden
F. W. Smith Jr.
BY ATT'Y (No Model.) 5 Sheets—Sheet 3.
H. M. CHITTENDEN.
APPARATUS FOR DIPPING HAT BODIES.

No. 436,771. Patented Sept. 23, 1890.

WITNESSES:

INVENTOR
Harvey M. Chittenden
BY
ATTORNEY (No Model.) 5 Sheets—Sheet 4.

H. M. CHITTENDEN.
APPARATUS FOR DIPPING HAT BODIES.

No. 436,771. Patented Sept. 23, 1890.

WITNESSES:

INVENTOR
Harvey M. Chittenden
BY ATT'Y

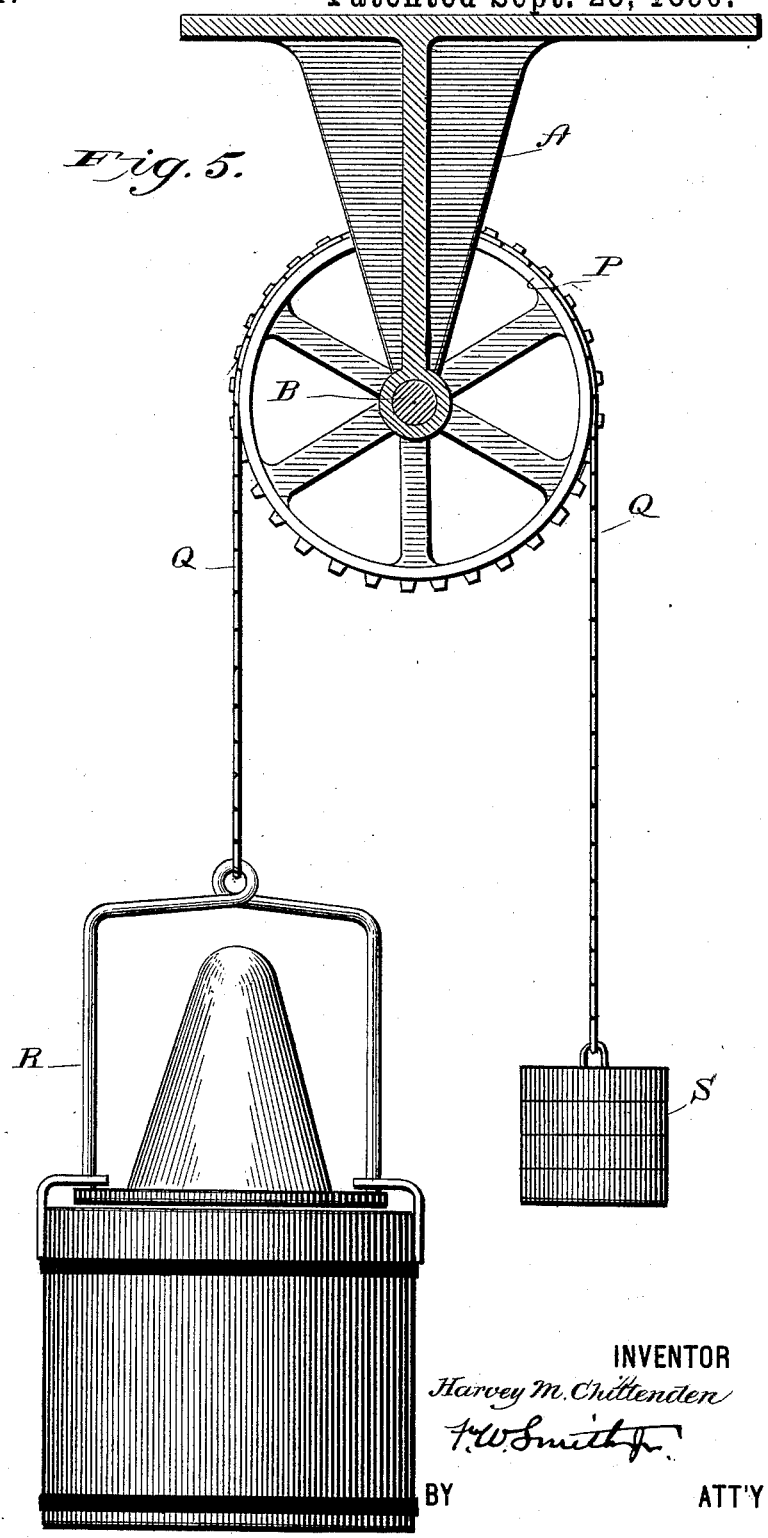

UNITED STATES PATENT OFFICE.

HARVEY M. CHITTENDEN, OF DANBURY, ASSIGNOR TO THE HAT DIPPING MACHINE COMPANY, OF SOUTH NORWALK, CONNECTICUT.

APPARATUS FOR DIPPING HAT-BODIES.

SPECIFICATION forming part of Letters Patent No. 436,771, dated September 23, 1890.

Application filed March 28, 1890. Serial No. 345,684. (No model.)

*To all whom it may concern:*

Be it known that I, HARVEY M. CHITTENDEN, a citizen of the United States, residing at Danbury, in the county of Fairfield and State of Connecticut, have invented certain new and useful Improvements in Apparatus for Dipping Hat-Bodies; and I do hereby declare the following to be a full, clear, and exact description of the invention, such as will enable others skilled in the art to which it appertains to make and use the same.

My invention has reference to hat-making machinery, but more particularly refers to an apparatus for dipping hat-bodies while on the cone, the especial object of this invention being to raise the hat from the water in the dipping-tub at an accelerated speed, whereby a great saving of time is effected and the capacity of the apparatus thereby greatly increased.

Figure 1:
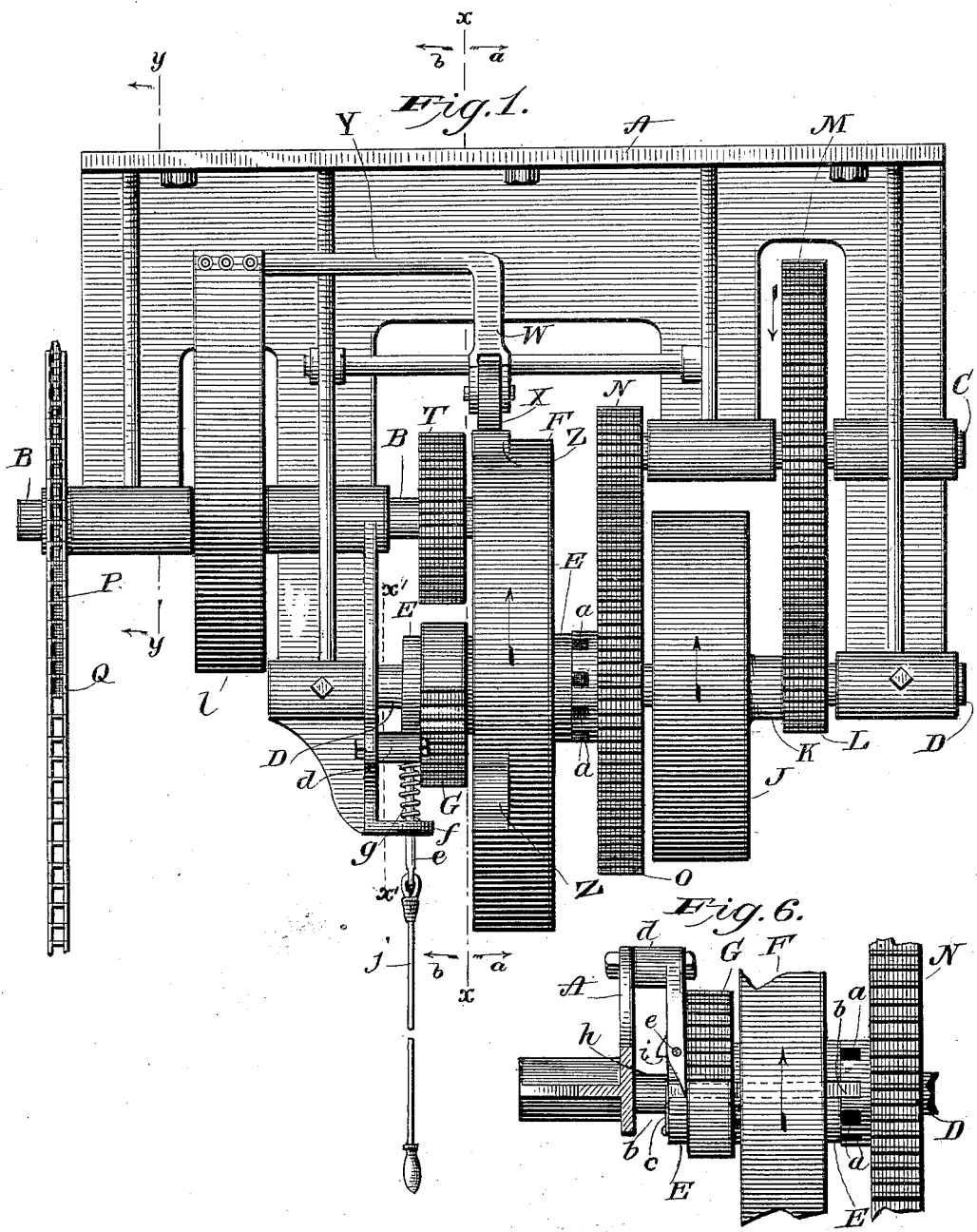
Figure 2:
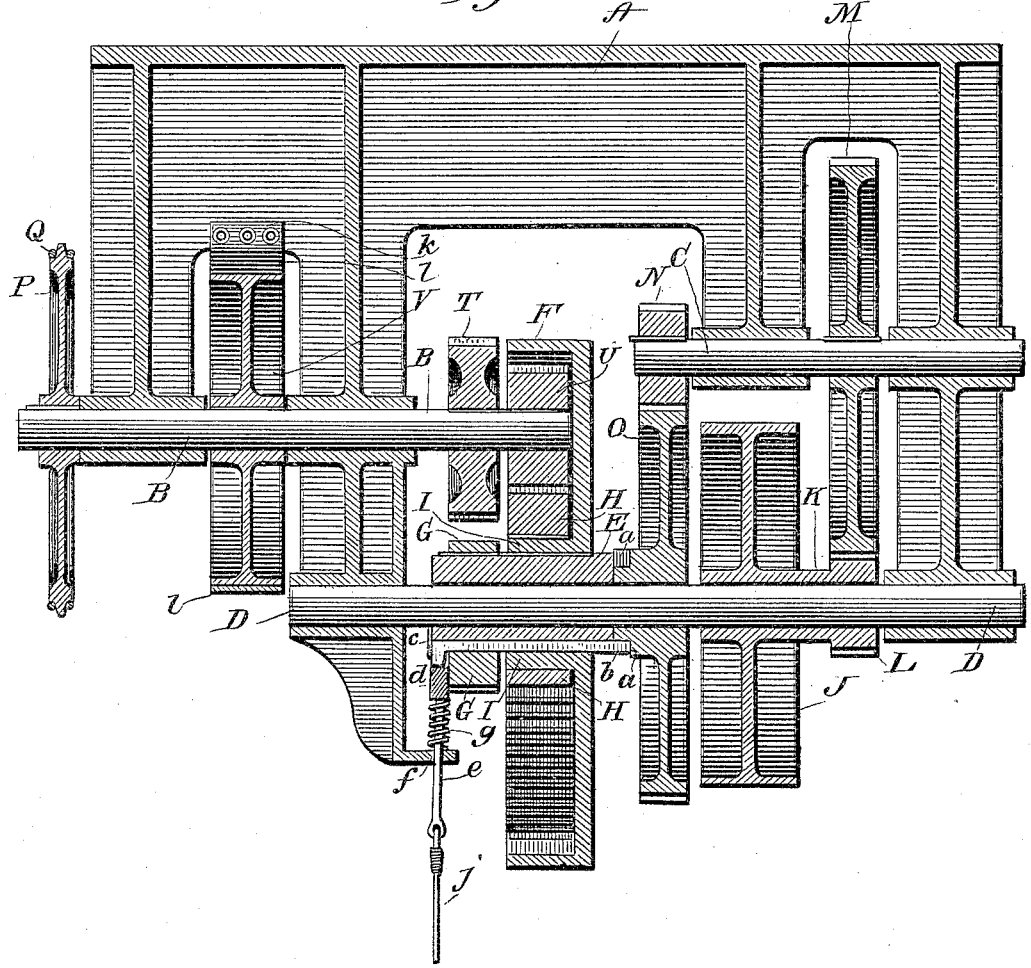
Figure 7:
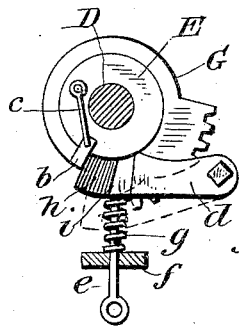
Figure 3:
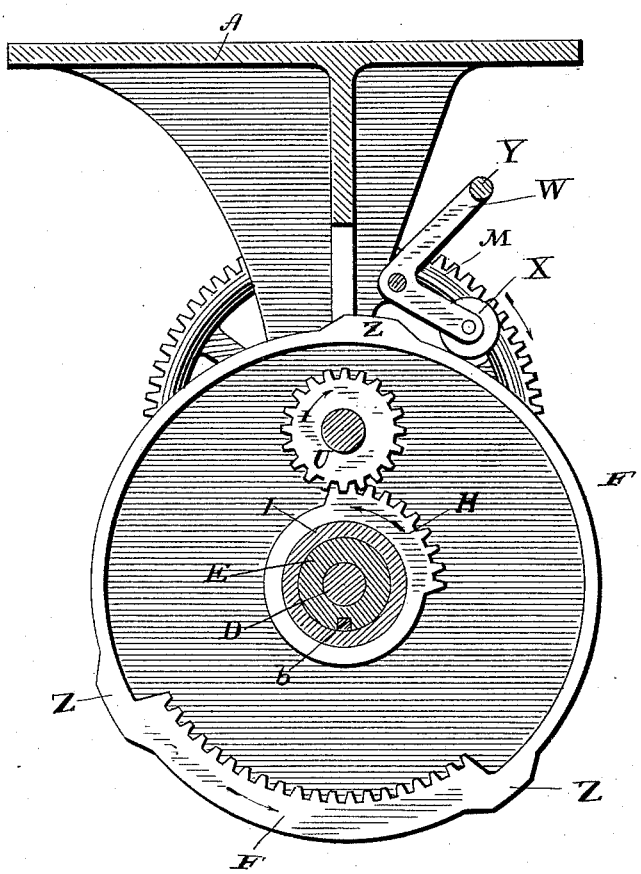
Figure 4:
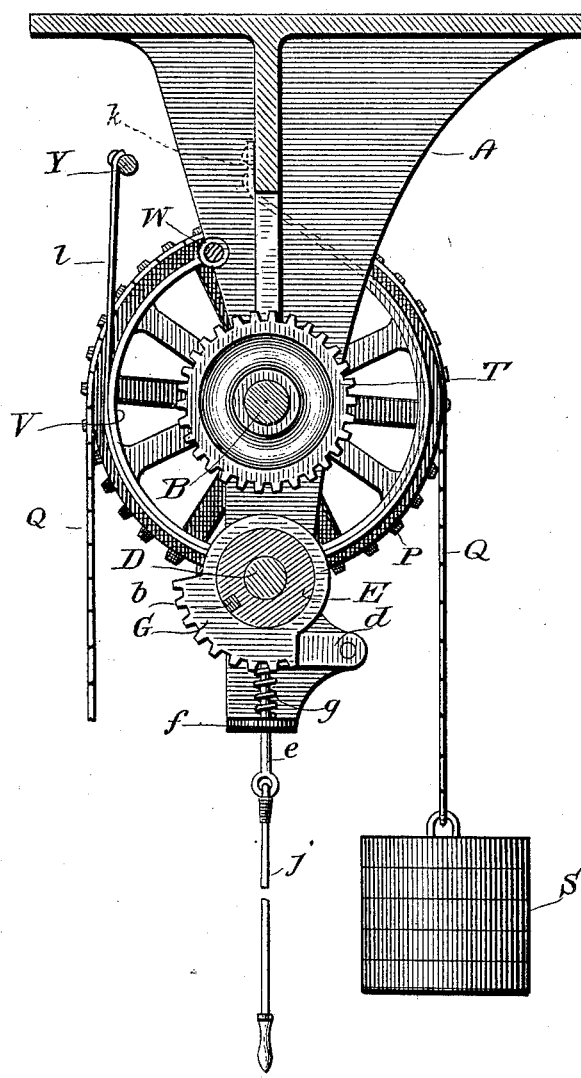

In the accompanying drawings, Figure 1 is a front elevation of a machine embodying my improvement, the cone-supporting platform and tub not being shown; Fig. 2, a vertical longitudinal section of the construction shown at Fig. 1; Fig. 3, a section at the line $x\ x$ of Fig. 1, looking in the direction of the arrows $a\ a$; Fig. 4, a section at the line $x\ x$ of Fig. 1, looking in the direction of the arrows $b\ b$; Fig. 5, a section at the line $y\ y$ of Fig. 1, showing the arrangement of the dipping-tub, the cone-supporting platform, the sprocket-wheel and chain, and the counterbalancing-weight; Fig. 6, a detail bottom view, partly in section, of the clutch mechanism; and Fig. 7, a detail section at the line $x'\ x'$ of Fig. 1.

Similar letters denote like parts in the several figures of the drawings.

A is a hanger, which is secured to the ceiling of the work-room, and B C are shafts journaled in suitable bearings in said hanger.

D is a shaft, which is rigidly secured within said hanger, and E is a sleeve loose on said shaft.

F is an internal segmental gear, and G is an ordinary segmental gear, both of which are keyed to said sleeve. H is an ordinary segmental gear keyed on the hub I of the gear F. Therefore it will be understood that the aforesaid gears are practically rigid on the sleeve E and will move in synchronism with the latter.

J is the power-pulley loose on the shaft D and having formed upon its hub K the gear L.

M N are gears keyed on the shaft C, the former of which gears meshes with the gear L, while the gear N meshes with the gear O, loose on the shaft D. The hub of the gear O adjacent to the sleeve is provided with notches $a$, while a bolt $b$ extends loosely through said sleeve and is adapted to be thrown within said notches, as will be presently explained. A spring $c$, secured to the other end of the sleeve and bearing against the heel end of said bolt, tends to shoot the latter forward.

$d$ is a detent pivoted to the hanger, and $e$ is a pin extending freely through an extension $f$ of the hanger and secured to said detent. $g$ is a coil-spring around said pin and bearing against the extension $f$ and the detent, whereby the latter is sustained in elevation. The nose of said detent is beveled, as seen at $h$, and is within the field of travel of the heel end of the bolt, so that when the said heel end is carried against the beveled nose the bolt will be withdrawn against the resilience of the spring $c$, and said heel end will be arrested by the stop-shoulder $i$ at the base of the beveled nose.

Keyed to the outer end of the shaft B is a sprocket-wheel P, over which runs a chain Q, one end of which is secured to the bail R of the cone-supporting platform, the other end having attached thereto a counter-balance S.

At the inner end of the shaft B are keyed gears T U, the former of which is adapted to mesh with the segment G, while the latter is engaged by the segments F H, as will be presently set forth.

Power is communicated to the machine from the pulley J by pulling down the pin $e$, whereby the bolt will be released from the detent and will spring into engagement with the notched hub of the gear O.

The gear F revolves in the direction indicated by the arrows in Figs. 1 and 3.

The arrangement of the segments F G H is such that they are timed in their operation as follows: As hereinbefore explained, these segments are rigidly secured together and have a common center of revolution. When the sleeve E is interlocked with the gear O through the medium of the bolt $b$, said sleeve will revolve and the segment H will engage the cog U and revolve the latter in the direction of the arrow, thereby operating the wheel P to lower the cone-supporting platform. Just as the segment H leaves the cog U the segment G will come into mesh with the cog T, thereby operating the latter to continue the lowering of the platform, as will be readily understood. By the time the segment G has left the gear T the wheel P will have been so operated as to have lowered the platform to the bottom of the tub. After the segment G has left the gear T there is an almost imperceptible dwell, and then the internal segment F will engage the cog U and revolve the same in a direction opposite to that heretofore described, thereby causing wheel P to be operated to elevate the platform to normal position, the withdrawal of the bolt $b$ and the abutment of the heel end thereof against the stop-shoulder of the detent being so timed as to occur when the platform has reached its normal position.

In relation to the operations of these segments and gears, I would call attention to the all-important facts that the primary operating-segment H has a longer radius than the passive cog U, while the secondary segment G has a shorter radius than the passive cog T, the result being that the wheel P will be revolved at two speeds, the latter of which is slower than the former. This revolution of the wheel P is necessary, for the submerging of the cone should be gradual toward the latter stage, in order that the compressed air may escape through the cone without mutilating the hat-body. The segment F, having a radius of a length far greater than that of the cog U, will, during its engagement with the latter, revolve the wheel P at a speed sufficient to rapidly raise the platform to normal position.

Any suitable drop-cord $j$ may be attached to the clutch-pin $e$ in order to conveniently operate the latter.

In order that there may be no slipping or backlash at the times when one segment is ceasing its function and another segment just commencing to operate, I provide a friction-brake, which comprises the following instrumentalities: a band-wheel V, keyed on the shaft B, a bell-crank W, pivoted within the hanger A and having at its lower end a friction-roll X, a band around the wheel V, secured at one end to the hanger, as seen at $k$ in Fig. 2 and in dotted lines at Fig. 4, the other end of said band being secured to the extension Y of the bell-crank, and lugs Z on the outer periphery of the wheel F, adapted to strike against the roll X and operate the bell-crank. These lugs are so located on the wheel F that they will operate the bell-crank just as one segment ceases and another begins to operate, and the operation of said crank tightens the band around the wheel V, so as to hold the wheel P until the operating-segment has fairly commenced its function. Of course this brake is not absolutely necessary, and perhaps I might dispense with it altogether, for the cone-supporting platform and the counterbalance S are of about the same weight, and no particular harm could result even if the wheel P were left free to revolve in either direction.

Heretofore the plunging of the cone within the tub with the proper variations of speed has been successfully accomplished; but the raising of the cone has never been automatically accomplished save at a speed which is in a measure limited by the speed at which the cone is submerged. In other words, too much time has been consumed in the raising of the cone. Now it makes no difference with the quality of the work produced whether the cone is raised slowly or swiftly; but it does make a decided difference in the amount of work produced if the cone is raised quickly. My invention greatly increases the capacity of hat-dipping machines, in that there is no time lost which could possibly be utilized by the operator.

Having thus fully described my invention, what I claim as new, and desire to secure by Letters Patent, is—

1. In a hat-dipping machine, the combination of the cone-supporting platform and the shaft B, which controls the operation of said platform and has secured thereto the cogs U T, the latter of which is larger than the former, with the rotary segments H G, having the same axis of rotation and adapted to successively operate the cogs U T, whereby two separate speeds are imparted to the shaft B, substantially as set forth.

2. In a hat-dipping machine, the combination, with a rotary system of gearing having a common axis of revolution, and comprising two segmental gears of different diameters and an internal segmental gear of a much larger diameter than that of said gears, of a pair of cogs of different diameters mounted on the shaft which directly controls the operation of the cone-supporting platform, the sprocket-wheel on said shaft, the chain carried by said wheel, and the cone-supporting platform depending from said chain, said segmental gears being so timed as to operate said cogs in succession, while the internal segmental gear is timed to engage the adjacent cog immediately afterward, substantially as set forth.

3. In a hat-dipping machine, the combination, with the cone-supporting platform and the shaft connected to said platform and controlling the operation thereof, of a pair of cogs of different diameters secured to said shaft and a pair of segmental gears adapted to successively engage with said cogs for revolving said shaft at two different speeds, substantially as shown and set forth.

4. In a hat-forming machine, the combination, with the rotary sleeve E, the segmental gear G, and internal segmental gear F, mounted on said sleeve, of the segmental gear H, mounted on the hub of the gear F, the shaft B, having at its inner end the cogs T U, respectively opposite to the gears G H, the sprocket-wheel P on said shaft, the sprocket-chain over said wheel, and the cone-supporting platform suspended from said chain, substantially as set forth.

5. In a hat-dipping machine, the combination, with the cone-supporting platform and the shaft to which said platform is connected and whose revolution effects the raising and lowering of said platform, of instrumentalities for revolving said shaft at different speeds during the lowering of the platform and means for effecting the reverse movement of said shaft at a single increased speed during the raising of the platform, substantially as set forth.

6. The combination of the hanger A, the shaft D, secured rigidly therein, the power-pulley J, gear O, and sleeve E, all loosely mounted on said shaft, the cog L, formed on the hub of the power-pulley, the shaft C, journaled within the hanger and having rigid therewith the gears M N, which mesh, respectively, with the gears L O, the internal segmental gear F, rigid on said sleeve, the segmental gear H, rigid on the hub of the internal gear F, the segmental gear G, rigid on the said sleeve, the shaft B, journaled in the hanger, the cogs T U, keyed to said shaft and adapted to be operated by the segment G and by the segments H F, and a clutch contrivance whereby said sleeve is locked with the gear O, substantially as set forth.

7. The combination of the hanger, the shaft journaled in said hanger and having depending therefrom the cone-supporting platform, the band-wheel keyed to said shaft, the bell-crank pivoted within the hanger, the gear F, the lugs formed on the outer periphery of said gear and adapted to operate against said bell-crank, and the band around a portion of the circumference of said wheel and secured at the ends, respectively, to the hanger and to an extension of the bell-crank, substantially as set forth.

8. The combination, with the cone-supporting platform and the shaft which controls the operation of the same, of a brake and means for operating said brake at predetermined intervals, substantially as set forth.

In testimony whereof I affix my signature in presence of two witnesses.

HARVEY M. CHITTENDEN.

Witnesses:
GEORGE WAKEMAN,
HENRY M. ROBINSON.